(12) United States Patent
Kim

(10) Patent No.: US 11,335,219 B2
(45) Date of Patent: May 17, 2022

(54) DISPLAY MODULE FASTENING ASSEMBLY AND MULTI-DISPLAY DEVICE INCLUDING THE SAME

(71) Applicant: LG Display Co., Ltd., Seoul (KR)

(72) Inventor: Yongjoon Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 106 days.

(21) Appl. No.: 16/717,382

(22) Filed: Dec. 17, 2019

(65) Prior Publication Data

US 2020/0193877 A1 Jun. 18, 2020

(30) Foreign Application Priority Data

Dec. 18, 2018 (KR) ........................ 10-2018-0164345

(51) Int. Cl.
*G09F 9/302* (2006.01)
*G02F 1/1333* (2006.01)

(52) U.S. Cl.
CPC ...... *G09F 9/3026* (2013.01); *G02F 1/133308* (2013.01); *G02F 1/133314* (2021.01)

(58) Field of Classification Search
CPC ......... G02F 1/133308; G02F 1/133314; G09F 9/3026; G06F 1/1637; G06F 3/1446
See application file for complete search history.

(56) References Cited

U.S. PATENT DOCUMENTS

2018/0035559 A1\* 2/2018 Kim ..................... H05K 5/0017

FOREIGN PATENT DOCUMENTS

JP 2001309276 A \* 11/2001

\* cited by examiner

*Primary Examiner* — James Wu
(74) *Attorney, Agent, or Firm* — Seed Intellectual Property Law Group LLP

(57) ABSTRACT

Display module fastening assemblies are provided which facilitate installment of multi-display devices in small or limited spaces and without needing access to a rear side of the devices. A display module fastening assembly includes a back cover. A fastener receptacle includes a groove formed in a sidewall of the back cover. A fastener is detachably securable to the fastener receptacle. A support protrusions may extend outwardly from a contact portion of the fastener, and the support protrusion is configured to fit into the groove of the fastener receptacle when the contact portion is inserted into the back cover.

22 Claims, 13 Drawing Sheets

DISPLAY MODULE FASTENING ASSEMBLY AND MULTI-DISPLAY DEVICE INCLUDING THE SAME

CROSS-REFERENCE TO RELATED APPLICATION

This application claims priority to Korean Patent Application No. 10-2018-0164345, filed on Dec. 18, 2018, the disclosure of which is incorporated herein by reference in its entirety.

BACKGROUND

Technical Field

The present disclosure relates to a display module fastening device and a multi-display including the same.

Description of the Related Art

When a display device is installed in a place where many people are crowded or in a public facility used by many people, a large-sized display device may be desired due to the characteristics of the installed place. For example, a large-sized display device may be desired so that many people can view the display device even in a crowded environment. Although a multi-display device is composed of a plurality of displays, the multi-display device is driven so that an image is displayed on one screen which is formed by the plurality of displays, such that the multi-display device can effectively provide image information to many people in a public place or the like.

In general, the multi-display device can be implemented by arranging a plurality of display modules in a tile form. For example, a plurality of displays may be positioned as "tiles" that are adjacent to one another and which collectively form a larger display.

BRIEF SUMMARY

When a plurality of display modules are installed in the rear space of a multi-display device, the work space of the worker should be secured in the rear space of the multi-display device, such that a large space is generally needed to install the multi-display device in an environment, such as a public place or a public facility.

In various embodiments, the present disclosure provides a display module fastening assembly and a multi-display device including the same, which are prepared to easily arrange a plurality of display modules in a tile form or tiled configuration in which each of the display modules is adjacent to at least one other display module and the tiled configuration of display modules is capable of collectively operating as a single display device to display images.

In one or more embodiments, the present disclosure provides a display module fastening assembly that includes a back cover, a fastener receptacle, and a fastener. The back cover has a rear surface and sidewalls that extend from the rear surface along a first direction. The fastener receptacle includes a groove formed in a sidewall of the back cover. The fastener is configured to be detachably received in the groove of the fastener receptacle.

In one or more embodiments, the present disclosure provides a display panel module that includes a display panel, a fastener, and back cover. The fastener is attached to a surface of the display panel. The back cover has a surface and sidewalls connected to the surface. The back cover includes a fastener receptacle arranged along one of the sidewalls, and the fastener receptacle is configured to receive the fastener. The display panel is configured to be detachably coupled to the back cover at any of a plurality of positions, and each of the plurality of positions corresponds to a different depth at which the fastener extends toward the surface of the back cover and is coupled to the fastener receptacle.

In one or more embodiments, the present disclosure provides a multi-display device that includes a plurality of display panel modules arranged in a tiled configuration, each of the display panel modules disposed adjacent to at least one other of the display panel modules. Each of the display panel modules includes a display panel, a fastener attached to a surface of the display panel, and a back cover having a surface and sidewalls connected to the surface. The back cover includes a fastener receptacle arranged along one of the sidewalls, and the fastener receptacle is configured to receive the fastener. Each of the display panels is configured to be detachably coupled to a respective back cover at any of a plurality of positions, with each of the plurality of positions corresponding to a different depth at which the fastener extends toward the surface of the respective back cover and is coupled to the fastener receptacle.

DETAILED DESCRIPTION

Figure 1:
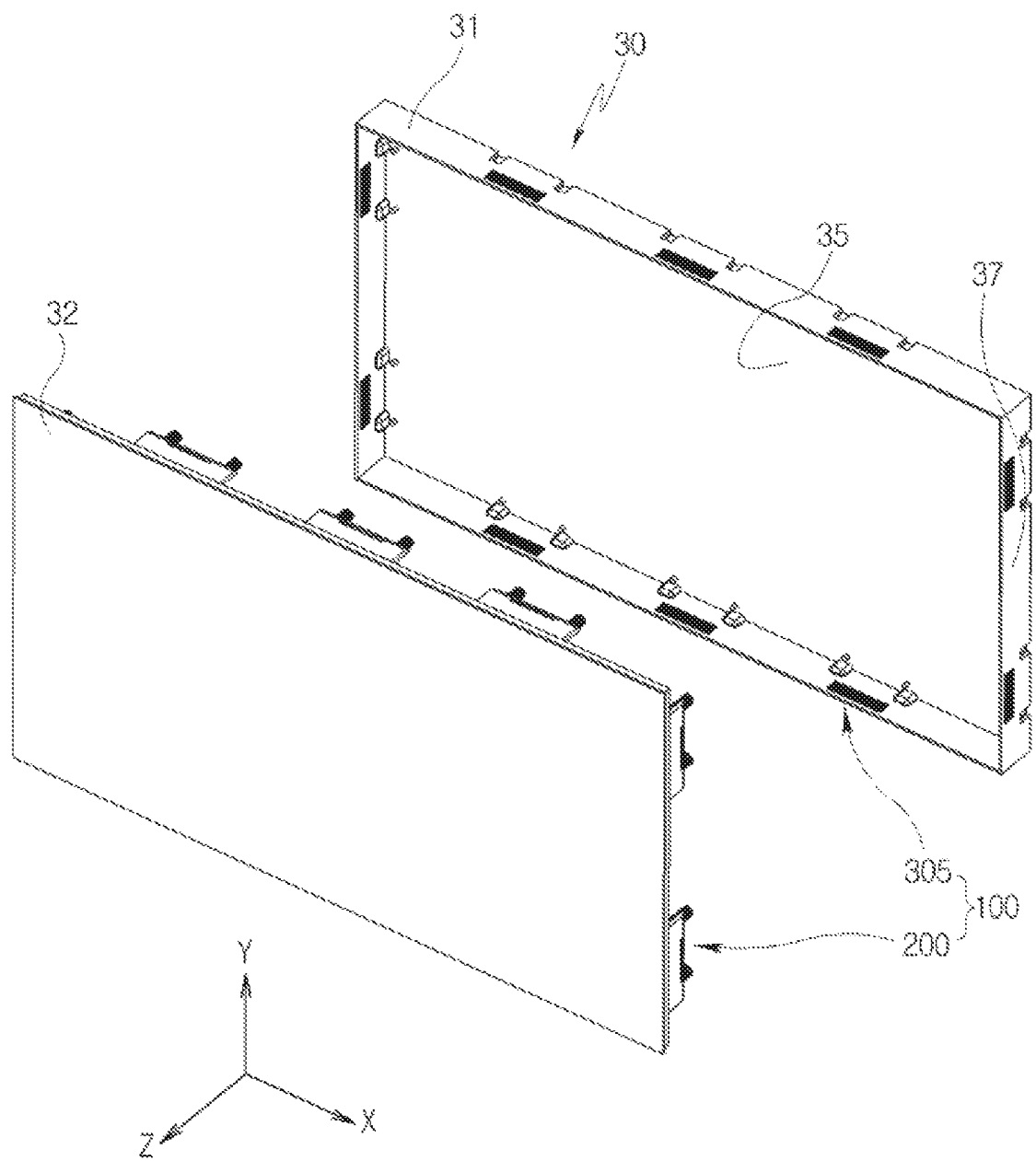
FIGS. 1 and 2 are exploded perspective diagrams schematically illustrating a display module having a display module fastening assembly according to one or more embodiments of the present disclosure.

In order to facilitate understanding of the features of the present disclosure, a display module fastening device and a multi-display including the same according to embodiments of the present disclosure will be described in more detail below.

It should be noted that, in order to facilitate understanding of the embodiments described below, in denoting the reference numerals to the components in each accompanying drawing, the same components are denoted by the same reference numerals where possible or convenient for description, even though they are illustrated in different drawings. In addition, in the description of the present disclosure, a specific description of related known configurations or functions may be omitted when it is determined that such specific description of related known configurations or functions would otherwise obscure the subject matter of the present disclosure.

Hereinafter, various embodiments of the present disclosure will be described with reference to the accompanying drawings.

Figure 2:
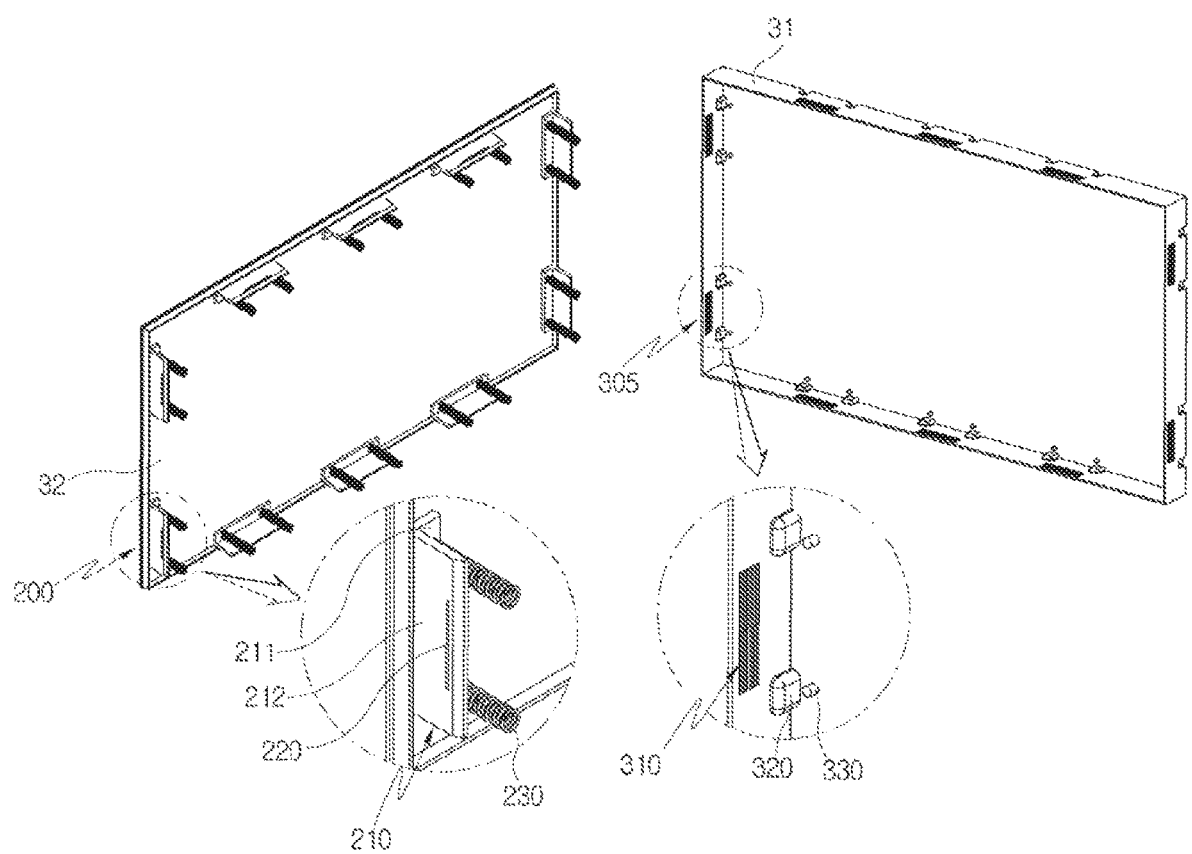
Figure 3A:
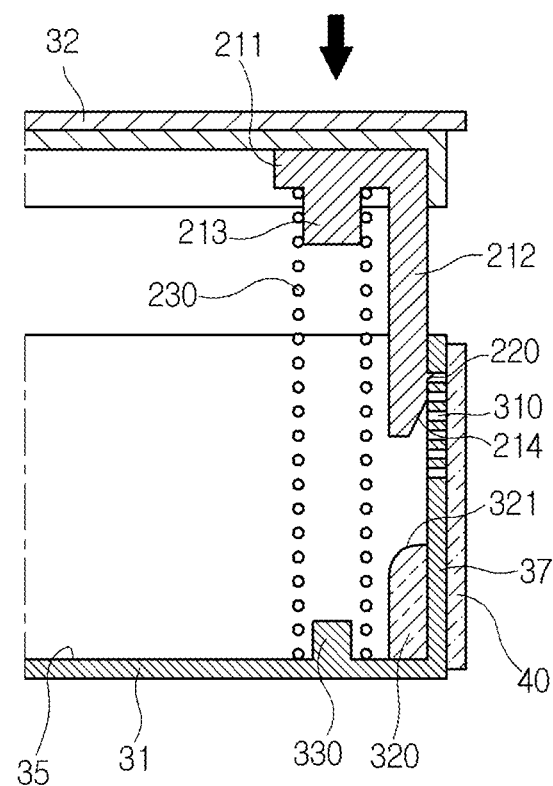
FIGS. 3A and 3B are cross-sectional diagrams schematically illustrating a sequence or operation in which the display module fastening assembly according to one or more embodiments of the present disclosure is fastened and supported in the z-axis direction.
Figure 3A:
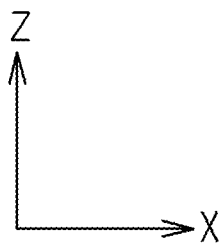
Figure 3B:
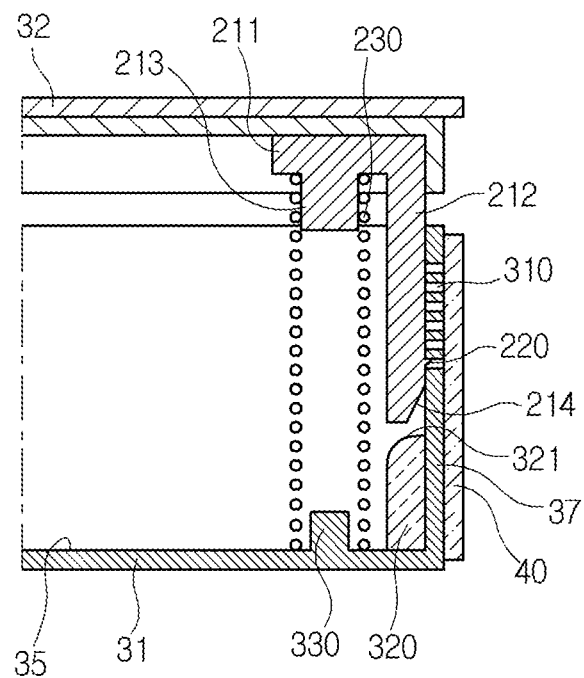
Figure 4A:
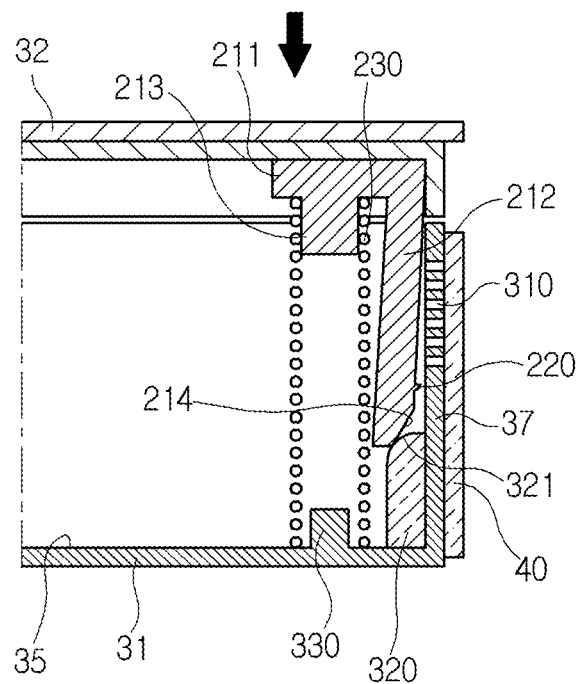
FIGS. 4A and 4B are cross-sectional diagrams schematically illustrating a sequence or operation in which the display module fastening assembly according to one or more embodiments of the present disclosure is disassembled and a display panel is separated from a back cover.
Figure 4B:
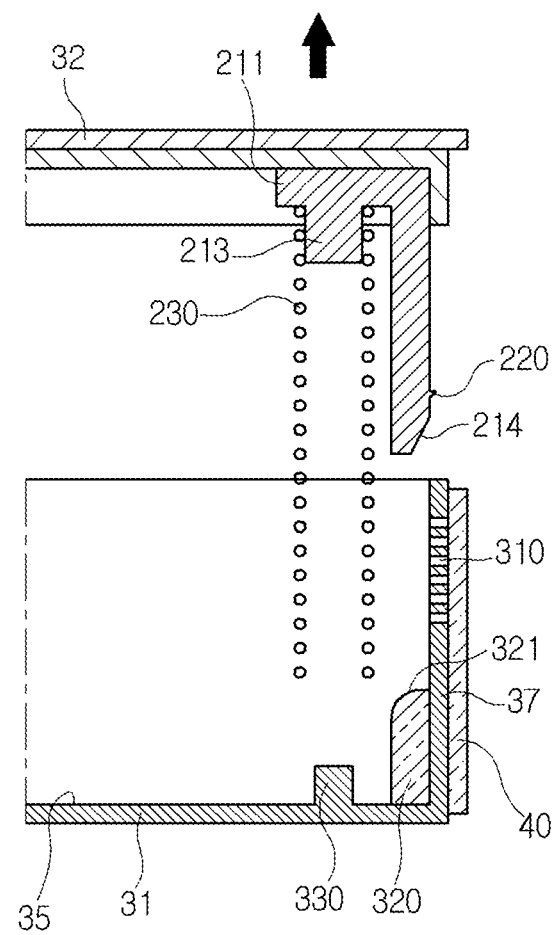

FIGS. 1 and 2 are exploded perspective diagrams schematically illustrating a display module in which a display module fastening device according to an embodiment of the present disclosure has been provided, FIGS. 3A and 3B are cross-sectional diagrams schematically illustrating a sequence or operation in which the display module fastening device according to an embodiment of the present disclosure is fastened and supported in the z-axis direction, and FIGS. 4A and 4B are cross-sectional diagrams schematically illustrating a sequence or operation in which the display module fastening device according to an embodiment of the present disclosure is disassembled and a display panel is separated from a back cover.

Referring to FIGS. 1 to 4B, a display module fastening assembly 100 according to an embodiment of the present disclosure is provided on a display panel 32 which may be detachably coupled to a back cover 31, and the display module fastening assembly 100 is operable to detachably fasten the display panel 32 to the back cover 31, for example, by pressing the display panel 32 toward the back cover 31, as will be described in further detail later herein.

Herein, the display module 30 includes the back cover 31 and the display panel 32 which may be inserted into and fastened to the back cover 31. The back cover 31 may be fastened to a frame or a wall body. For example, the back cover 31 may be fastened to a frame, a wall, or any suitable structure at a desired viewing position, and the display panel 32 may be inserted into and fastened to the back cover 31 thereby fixing a position of the display panel 32.

In some embodiments, the display panel 32 may be an organic light emitting display panel. In such embodiments, the display panel 32 may include a plurality of pixels, and each of the plurality of pixels may include an anode, a cathode, and an organic light emitting layer disposed between the anode and the cathode to emit light. The display panel 32 may display an image by using the light output in the display direction (e.g., the Z-axis direction) from the organic light emitting layer of each of the plurality of pixels. Of course, the display panel 32 is not limited to the organic light emitting display panel and in various embodiments, the display panel 32 may be any display panel in any form capable of emitting light or displaying an image. In some embodiments, the display panel 32 may be a liquid crystal display (LCD) panel. In some embodiments, the display panel 32 may be a display panel which emits light for lighting purposes (e.g., alternatively or in addition to image display purposes), such as an organic light emitting display panel that emits a single or multiple colors of light for providing lighting in an environment in which it is installed.

The back cover 31 is configured to support the back surface of the display panel 32, which may supplement the rigidity of the display panel 32 when the display panel 32 is inserted into and secured by the back cover 31. In some embodiments, the back cover 31 is made of or includes a metal material such as an iron plate for reinforcing the rigidity. In some embodiments, the back cover 31 is formed of or includes a magnetic or ferromagnetic material, such as iron, cobalt, nickel or any other magnetic material. In some embodiments, when the back cover 31 is formed as a plate, such as an iron plate, which is responsive to a magnetic force, the back cover 31 can be easily secured to and detached from the frame or the wall body made of a metal material by the magnetic force of the magnet. Of course, the method for fastening the back cover 31 to the frame or the wall body is not limited thereto and can be fastened by various conventional fastening methods. For example, in various embodiments, the back cover 31 may be fastened to a frame, wall body, or other structure by an adhesive material, fastening members such as bolts, threaded screws, rivets, or any other suitable fastening methods.

The display module fastening assembly 100 is provided on the back surface of the display panel 32 so that the display panel 32 may be fastened and fixed to the back cover 31 when the display panel 32 is inserted into the back cover 31, and when the display panel 32 is pressed toward or into the back cover 31. In some embodiments, the display panel 32 may be fixed at any of a plurality of positions with respect to the back cover 31, which may depend upon an amount of pressing force applied to press the display panel 32 into or toward the back cover 31. For example, in some embodiments, the display panel 32 may be fixable at a first position when the display panel 32 is first inserted into the back cover 31, and the display panel 32 may be gradually fixed at any of a plurality of successive positions by further inserting the display panel 32 into the back cover 31 by a pressing force, thereby setting the fastening height in the Z-axis direction of the display panel 32 to the desired height according to the user's selection.

Then, when the display panel 32 is detached from the back cover 31, the display panel 32 can be separated by an elastic restoring force of an elastic member 230 provided at the inside thereof when the display panel 32 is further pressed to the vicinity of the bottom surface of the back cover 31 and then the pressuring force is removed. That is, no separate tool for separating the display panel 32 is required, and the display panel 32 can be easily separated through a simple operation in which the user presses the display panel 32. Separation of the display panel 32 from the back cover 31 will be described in further detail later herein, for example, with respect to FIGS. 4A and 4B.

As shown in FIGS. 1 and 2, the display module fastening assembly 100 includes a plurality of fasteners 200 (which may be referred to herein as fastening parts 200) disposed along a surface (e.g., a back surface) of the display panel 32, and a plurality of fastener receptacles 305 each including a respective plurality of grooves 310 (which may be referred to herein as support grooves 310). Each of the fastener receptacles 305 may be disposed at a position opposite to one of the plurality of fastening parts 200 provided on the display panel 32. The fastener receptacles 305 having the support grooves 310 may be disposed along the side surfaces of the back cover 31. That is, the display module fastening assembly 100 may include a plurality of fasteners 200, which may be disposed to be spaced apart from each other along or adjacent to a periphery or outer perimeter of the display panel 32, thereby more stably fastening and supporting the display panel 32 to the back cover 31, e.g., when the fasteners 200 are inserted into and detachably fixed to the corresponding fastener receptacles 305 having the support grooves 310. Hereinafter, only a portion of the display module fastening assembly 100 prepared at any one side thereof will be described representatively. More particularly, description will be made with respect to a single fastener 200 and a single corresponding fastener receptacle 305 having a plurality of support grooves 310, which is representative of the additional corresponding sets of fasteners 200 and fastener receptacles 305 which may be arranged about the periphery or outer perimeter of the display panel 32 and back cover 31.

As previously mentioned, the display module fastening assembly 100 includes a fastener receptacle 305 having a plurality of support grooves 310 formed on the side surface of the back cover 31 (e.g., along an inner surface of a sidewall 37 of the back cover 31), and the fastening part 200 provided on the display panel 32 and supported by any one of the plurality of support grooves 310 to set the fastening height as desired in the Z-axis direction of the display panel 32.

The back cover 31 includes an inner rear surface 35 and sidewalls 37 which extend outwardly from the inner rear surface 35 (e.g., along the Z-axis direction, as shown). The support grooves 310 are arranged along inner surfaces of the sidewalls 37 and are spaced apart from the inner rear surface 35 of the back cover 31 in the Z-axis direction, which is the insertion direction of the display panel 32. In some embodiments, the support grooves 310 may be spaced apart from the inner rear surface 35 of the back cover 31 at a constant interval, e.g., with a distance between neighboring support grooves 310 being substantially the same. In other embodiments, the distance between some of the neighboring support grooves 310 may be different from other neighboring support grooves 310 of a same fastener receptacle 305.

As shown in FIG. 3A, when the display panel 32 is inserted into the back cover 31, a support protrusion 220 of the fastening part 200 provided on the display panel 32 is inserted into and supported by any one of the plurality of support grooves 310. The support protrusion 220 extends outwardly from a contact portion 212 of the fastener body 210 (which may be referred to herein as a fastening part body 210). That is, the support protrusion 220 extends toward the inner surface of the sidewall 37 of the back cover 31, and the support protrusion 220 may therefore be received within any of the plurality of support grooves 310 as the display panel 32 is inserted into the back cover 31. When the display panel 32 is further pressed into the back cover 31 (e.g., along the Z-axis direction, or the direction of the arrow shown in FIG. 3A), the support protrusion 220 of the fastening part 200 can move to another support groove 310 (e.g., closer to the back wall 35 of the back cover 31), thereby gradually changing the fastening height in the Z-axis direction of the display panel 32 to the desired height. This is shown in FIG. 3B, at which the fastening height is selected as may be desired to corresponds to a position at which the support protrusion 220 is inserted into a lowest support groove 310 (e.g., deepest within the back cover 31) among the plurality of support grooves 310.

The fastening part 200 includes the fastening part body 210, which includes a fixing portion 211 (which may be referred to herein as a fixing part 211) fastened or otherwise fixed to the display panel 32 and the contact portion 212 (which may be referred to herein as a close contact part 212) that extends outwardly from the fixing part 211 (and may be formed to be bent at the fixing part 211) and is in close contact with the inner surface of the sidewall 37 of the back cover 31 when the display panel 32 is inserted into the back cover 31. The support protrusion 220 protrudes laterally outwardly from the close contact part 212 (e.g., in a direction toward the plurality of support grooves 310) and may be inserted into any of the support grooves 310 to fix in position the fastening part body 210. The elastic member 230 has a first end (e.g., an upper end, as shown) fastened and fixed to the fixing part 211, and an opposite second end (e.g., a lower end, as shown) is in contact with the back cover 31. As will be described in further detail later herein, the elastic member 230 applies an elastic force so that the display panel 32 may be easily separated from the back cover 31 when the display panel 32 is pressed further toward the back cover 31, for example, from the position shown in FIG. 3B.

The fastening part body 210 is formed to be bent so that the fixing part 211 and the close contact part 212 are transverse to one another, with the close contact part 212 of the fastening part body 210 having a length extending from and transverse to the fixing part 211, e.g., in a direction toward the back cover 31. In some embodiments, the fixing part 211 and the close contact part 212 may be perpendicular to each other and may have a cross section in a ⏋ shape, and disposed so that the fixing part 211 is fastened to the back surface of the display panel 32, and the close contact part 212 is protruded outwardly from the side surface of the display panel 32. According to such a configuration, when the display panel 32 is inserted into the back cover 31 in a state where it has been fastened to the fastening part body 210, the close contact part 212 is inserted therein while closely contacting the side surface of the back cover 31.

Since the support protrusion 220 is protruded outwardly from the close contact part 212, the support protrusion 220 is also pressed in close contact with the inner surface of the sidewall 37 of the back cover 31 by a close contact force by which the close contact part 212 is in close contact with the inner surface of the sidewall 37 of the back cover 31 so that the support protrusion 220 can be easily inserted into the support groove 310. For example, in some embodiments, the close contact part 212 may be biased outwardly toward the inner surface of the sidewall 37 of the back cover 31, thereby pressing the support protrusion 220 toward and into the support grooves 310.

Figure 5:
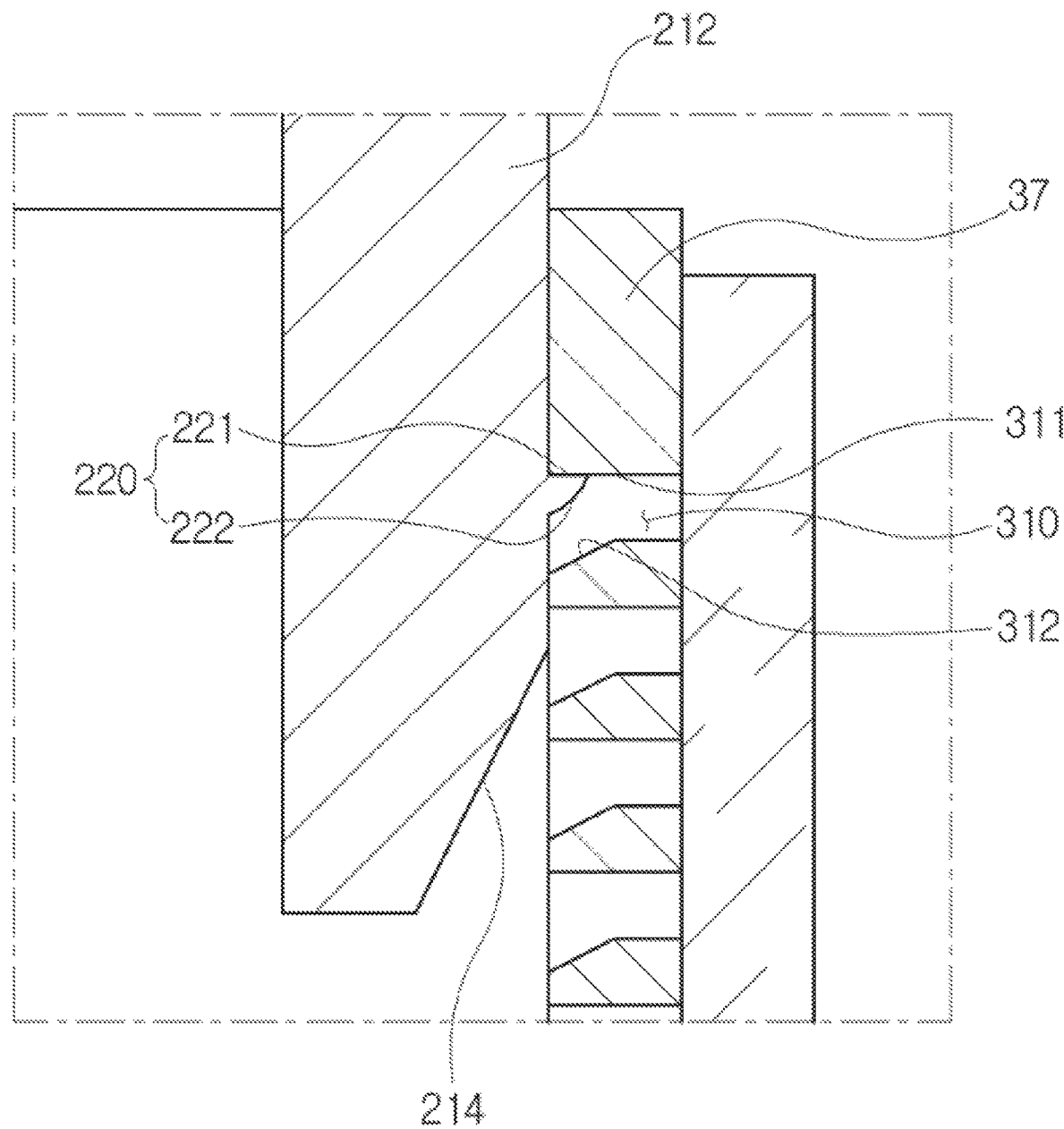
FIG. 5 is a cross-sectional diagram schematically illustrating a portion in which a support groove has been formed in the display module fastening assembly according to one or more embodiments of the present disclosure.

As shown, for example, in FIG. 5, the support protrusion 220 may include a support surface 221 that protrudes outwardly (e.g., toward the support grooves 310) from the close contact part 212 and extends in a direction generally parallel to a surface of the display panel 32, and a guide surface 222 that is inclined toward the close contact part 212 side from the end portion of the support surface 221. For example, as shown in FIG. 5, the guide surface 222 may extend at an inclined angle from a side surface of the close contact part 212 to an edge of the support surface 221.

Thus, when the support protrusion 220 is inserted into the support groove 310, the display panel 32 may be moved to the outside of the Z-axis direction separated from the back cover 31 (e.g., away from the inner rear surface 35 of the back cover 31) by the elastic force of the elastic member 230, and the support surface 221 of the support protrusion 220 can be closely supported to an upper surface 311 (which may be referred to herein as an upper side portion 311) of the support groove 310 to fix the position of the display panel 32. For example, when the display panel 32 is pressed inwardly (e.g., along the Z-axis) toward the inner rear surface 35 of the back cover 31, the support protrusion 220 may be inserted into a corresponding support groove 310. When the user releases the pressing force, the elastic member 230 may push the display panel 32 outwardly (e.g., along the Z-axis) in an opposite direction some small distance until the support surface 221 of the support protrusion 220 contacts the upper side portion 311 of the support groove 311. When so positioned, the elastic member 230 may continue to apply an outward force which maintains the support surface 221 of the support protrusion in contact with the upper side portion 311 of the support groove 311, thereby fixing a position or height of the display panel 32 with respect to the back cover 31. The elastic member 230 may be any elastic member having an elasticity suitable to be compressed and thereby allow for movement of the display panel 32 toward the back cover 31, and suitable to apply force against the display panel 32 (e.g., against the fastening part 200) to move the display panel 32 away from the back cover 31 when the display panel 32 is released or otherwise not secured to the back cover 31. In some embodiments, the elastic member 230 is a spring. However, embodiments of the present disclosure are not limited thereto.

Then, when the display panel 32 is further pressed inward toward the inner rear surface 35 of the back cover 31, the inclined guide surface 222 of the support protrusion 220 allows the support protrusion 220 to be slid inwardly from the support groove 310 (e.g., while being supported by or otherwise contacting a lower surface 312 or lower side portion 312 of the support groove 310). As the display panel 32 is further pressed inward, the support protrusion 220 may slide completely out of a first support groove 310 and may then be inserted into another support groove 310 disposed at the lower side of the fastener receptacle 305 (e.g., closer to the inner rear surface 35 of the back cover 31) after being separated from the first support groove 310. When the pressing force is removed, the support surface 221 can be again closely supported by the upper side portion 311 of the support groove 310 to fix the display panel 32 to another position.

Furthermore, as shown in FIGS. 3A to 4B, a fastening protrusion 213 is formed to be protruded from the fixing part 211 of the fastening part body 210 and extends in a direction toward the back cover 31, and a guide protrusion 330 is formed to be protruded at a position opposite to the fastening protrusion 213 and extends from the back cover 31 toward the fastening protrusion 213. A first end of the elastic member 230 may be fastened or fixed to the fixing part 211 or the fastening protrusion 213, with the first end of the elastic member 230 positioned on or around the fastening protrusion 213. The second end (e.g., opposite the first end) of the elastic member 230 may be inserted, for example, over the guide protrusion 330.

That is, the elastic member 230 is fastened and fixed to the fastening protrusion 213 at the first end thereof and moves with the display panel 32, and when the display panel 32 is inserted into the back cover 31, the second end of the elastic member 230 is inserted into or around the guide protrusion 330 and the guide protrusion 330 may fix a position of the second end of the elastic member 230, such that the second end of the elastic member 230 can be prevented from moving laterally (e.g., in the X-axis direction) thereby preventing the elastic member 230 from becoming damaged while sliding when the elastic member 230 is compressed (e.g., along the Z-axis direction).

According to such a configuration, when the display panel 32 is inserted into the back cover 31, the close contact part 212 of the fastening part body 210 is closely inserted into the inner surface of the sidewall 37 of the back cover 31, and the support protrusion 220 formed on the close contact part 212 is first inserted into the first support groove 310 disposed at the outermost in the Z-axis direction among the plurality of support grooves 310. Thereafter, when the display panel 32 is further pressed, the support protrusion 220 is supported while gradually moving deeper toward the inner rear surface 35 of the back cover 31 and is successively inserted into each of the plurality of support grooves 310, and when the user reaches the desired position, the pressing force can be removed to be installed at a desired height.

In some embodiments, the display module fastening assembly 100 further includes a guide rib 320 on the inner rear surface 35 of the back cover 31 in order to easily separate the display panel 32 from the back cover 31.

The guide rib 320 is protruded from the inner rear surface 35 of the back cover 31 along the inner surface of the sidewall 37 of the back cover 31 and the guide rib 320 may be spaced at a certain interval apart from the support groove 310. That is, an upper surface of the guide rib 320 may be spaced apart from a lowest or deepest one of the plurality of support grooves 310, e.g., along the Z-axis direction. When the display panel 32 is continuously pressed inwardly toward the inner rear surface 35 of the back cover 31, the end portion or surface of the close contact part 212 may contact the guide rib 320 which guides the close contact part 212 inwardly to be spaced apart from the inner surface of the sidewall 37 of the back cover 31, as shown in FIG. 4A.

The close contact part 212 has an inclined surface 214 which is inclined downwardly from an outer side surface side of the close contact part 212 on which the support protrusion 220 is provided. The end portion 321 of the guide rib 320 may be rounded as illustrated in FIG. 4A, and the inclined surface 214 of the close contact part 212 is guided by the end portion 321 of the guide rib 320 as the display panel 32 is pressed inwardly so that the close contact part 212 is easily bent to the inside thereof. For example, as the inclined surface 214 of the close contact part 212 is pressed inwardly against the rounded end portion 321 of the guide rib 320, the inclined surface 214 slides inwardly away from the inner surface of the sidewall 37 of the back cover 31, as shown in FIG. 4A.

As shown in FIG. 4B, when the user removes the pressing force, the display panel 32 moves in the direction of being separated from the back cover 31 (e.g., outwardly away from the back cover 31 along the Z-axis direction) by the elastic force of the elastic member 230. At this time, since the display panel 32 is detached from the back cover 31 before the bent close contact part 212 returns to the original position, the support protrusion 220 formed on the close contact part 212 cannot be inserted into the support groove 310, and thus the support protrusion 220 can be separated easily and simply.

FIG. 5 is a cross-sectional diagram schematically illustrating a portion in which a support groove has been formed in the display module fastening assembly according to one or more embodiments of the present disclosure.

Referring to FIG. 5, the support groove 310 is formed through the sidewall 37 of the back cover 31. Although the support groove 310 is shown and described as extending through the sidewall 37 of the back cover 31, in some embodiments, the support groove 310 may extend only partially into the sidewall 37 of the back cover 31. The upper side portion 311 of the support groove 310 is formed in parallel with the support surface 221 of the support protrusion 220 so that the support surface 221 of the support protrusion 220 is closely supported, and the lower side portion 312 of the support groove 310 is formed to be inclined so that the guide surface 222 of the support protrusion 220 is guided and the support protrusion 220 is easily detached.

One or both of the lower side portion 312 of the support groove 310 and the guide surface 222 of the support protrusion 220 can be formed to be rounded in order to be in point contact with each other when contacting each other, thereby reducing the frictional resistance.

Since the upper side portion 311 of the support groove 310 and the support surface 221 of the support protrusion 220 are in parallel surface contact with each other, the display panel 32 can be stably supported by the back cover 31, and the lower side portion 312 of the support groove 310 and the guide surface 222 of the support protrusion 220 are formed to be inclined downwardly toward the inside of the back cover 31, such that when the display panel 32 is pressed and the guide surface 222 of the support protrusion 220 contacts the lower side portion 312 of the support groove 310, the support protrusion 220 is guided to be easily detached from the support groove 310.

In some embodiments, an alignment member 40 may be attached to an outer surface of the sidewalls 37 of the back cover 30, as will be discussed in further detail later herein.

Figure 6:
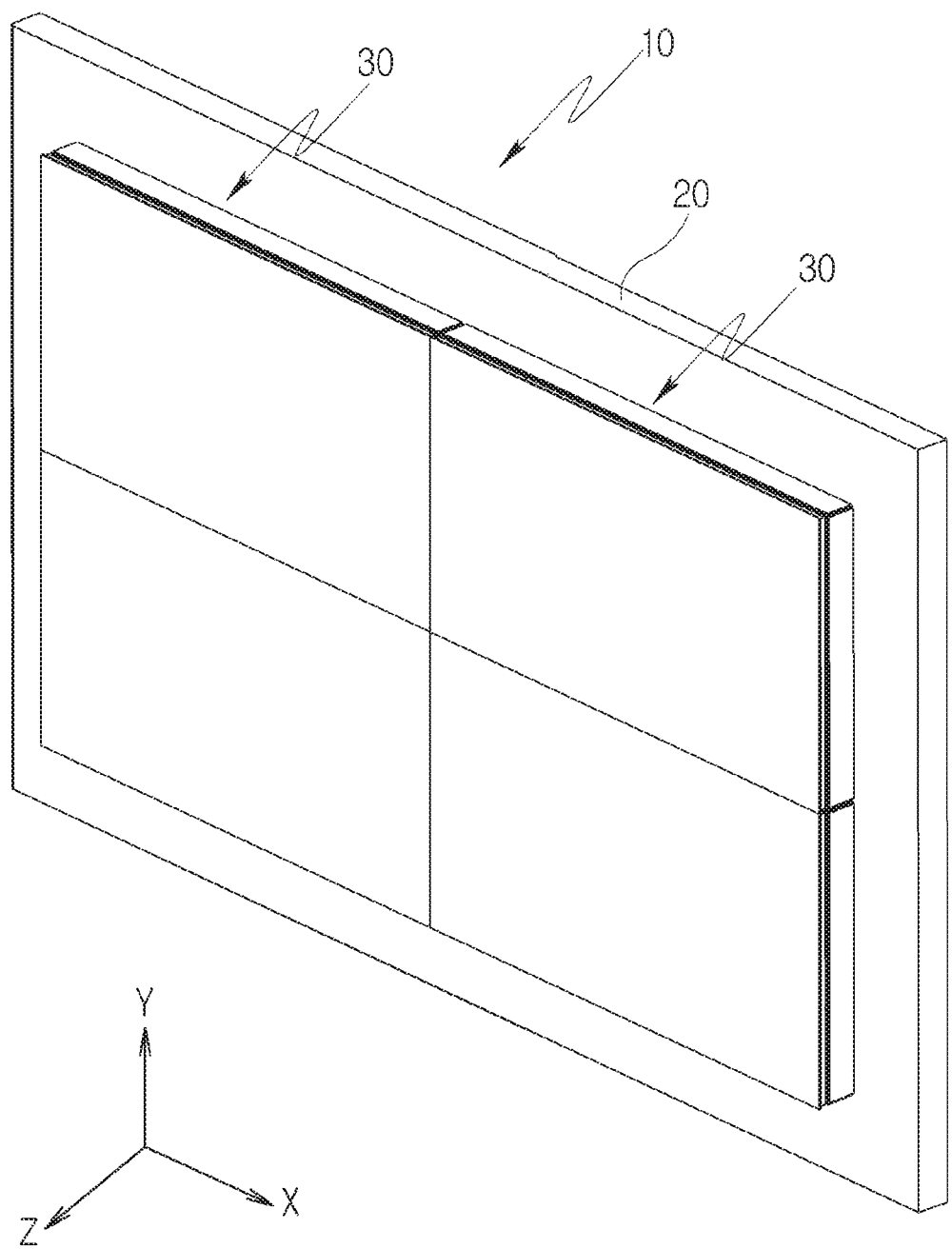
FIG. 6 is a perspective diagram schematically illustrating an installed multi-display according to one or more embodiments of the present disclosure.
Figure 7:
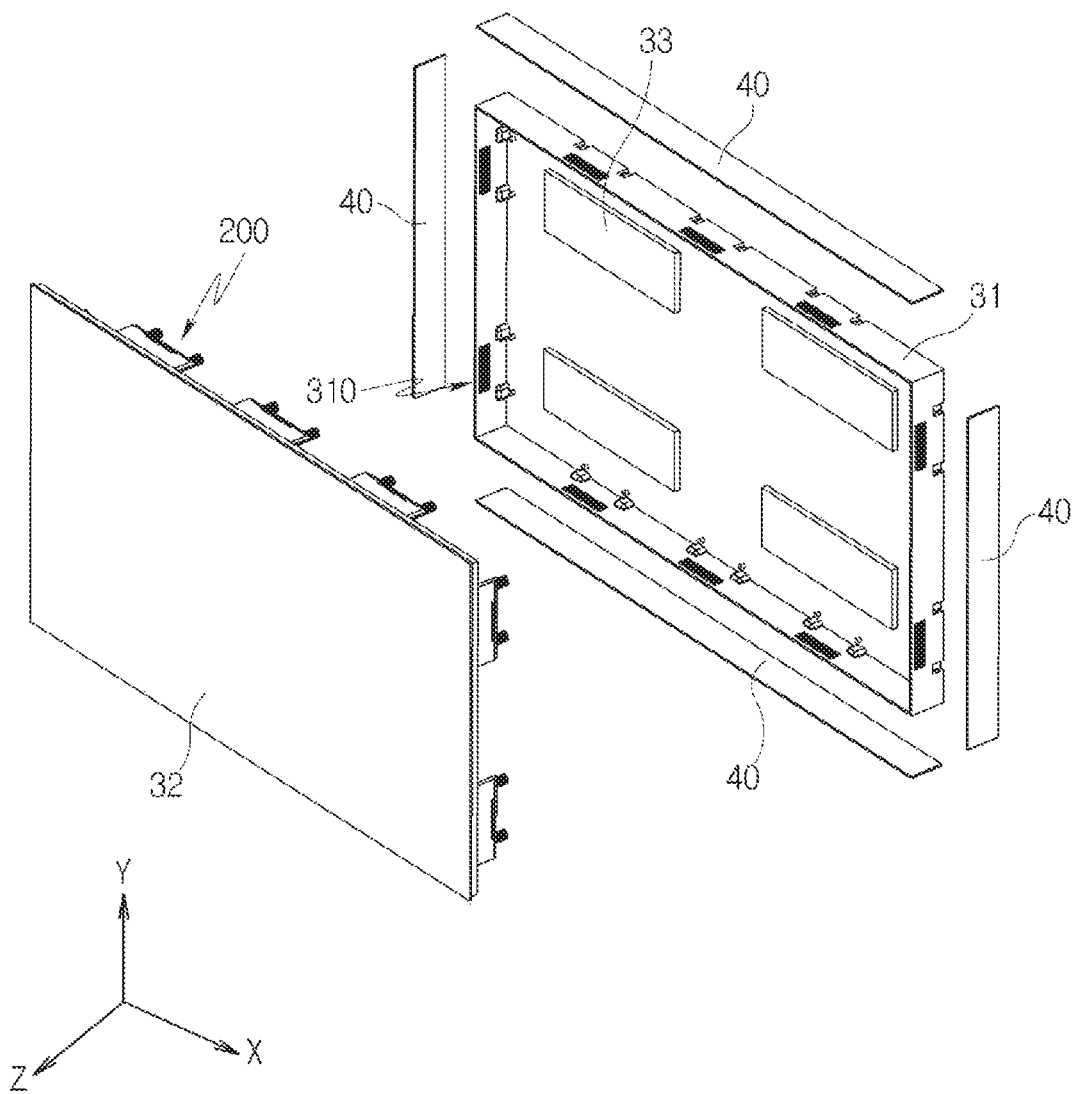
FIG. 7 is an exploded perspective diagram schematically illustrating a display module of the multi-display in which the display module fastening assembly and an alignment member have been provided according to one or more embodiments of the present disclosure.
Figure 8:
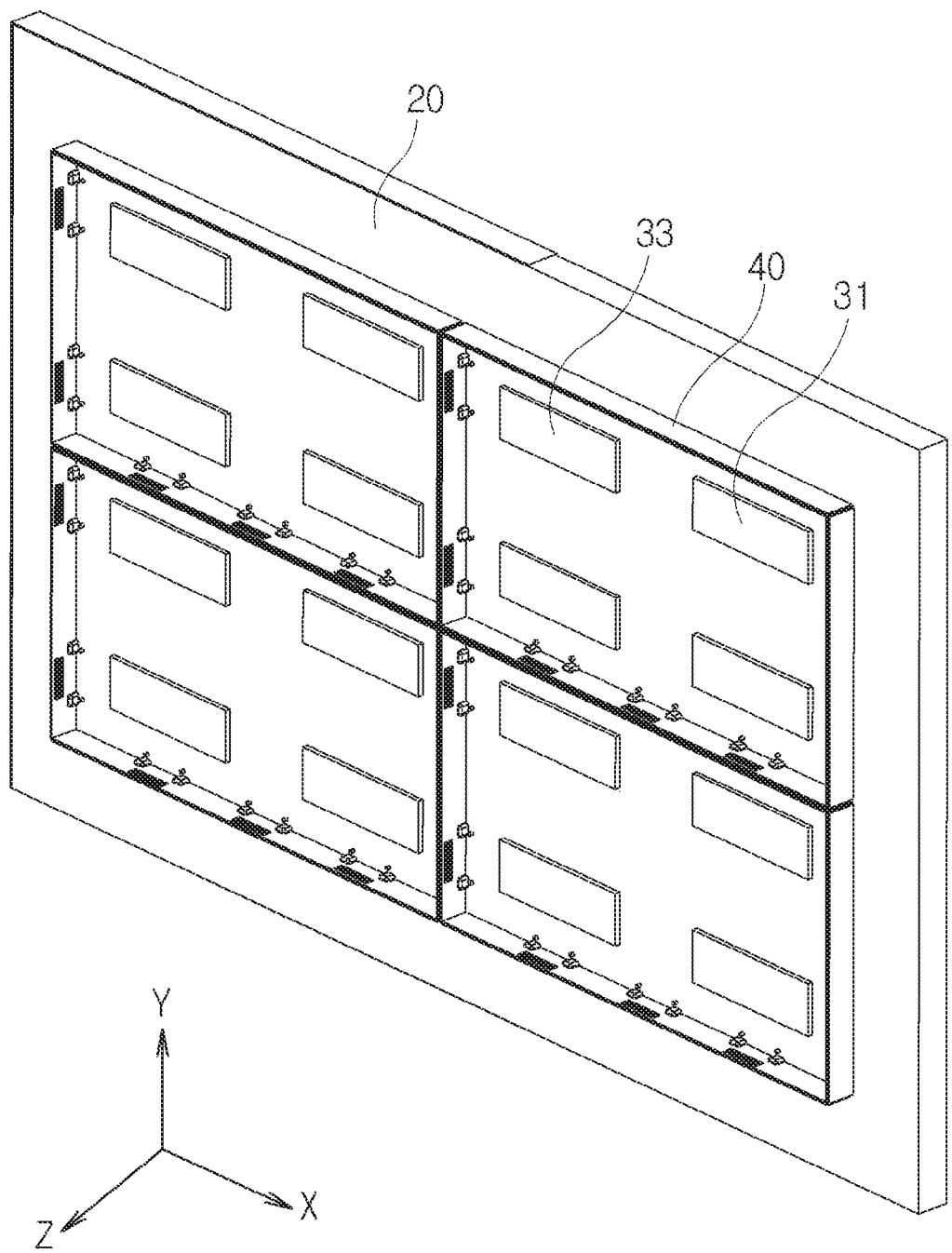
FIG. 8 is a perspective diagram schematically illustrating a state where the back cover of display modules of the multi-display has been installed at a base frame according to one or more embodiments of the present disclosure.
Figure 9:
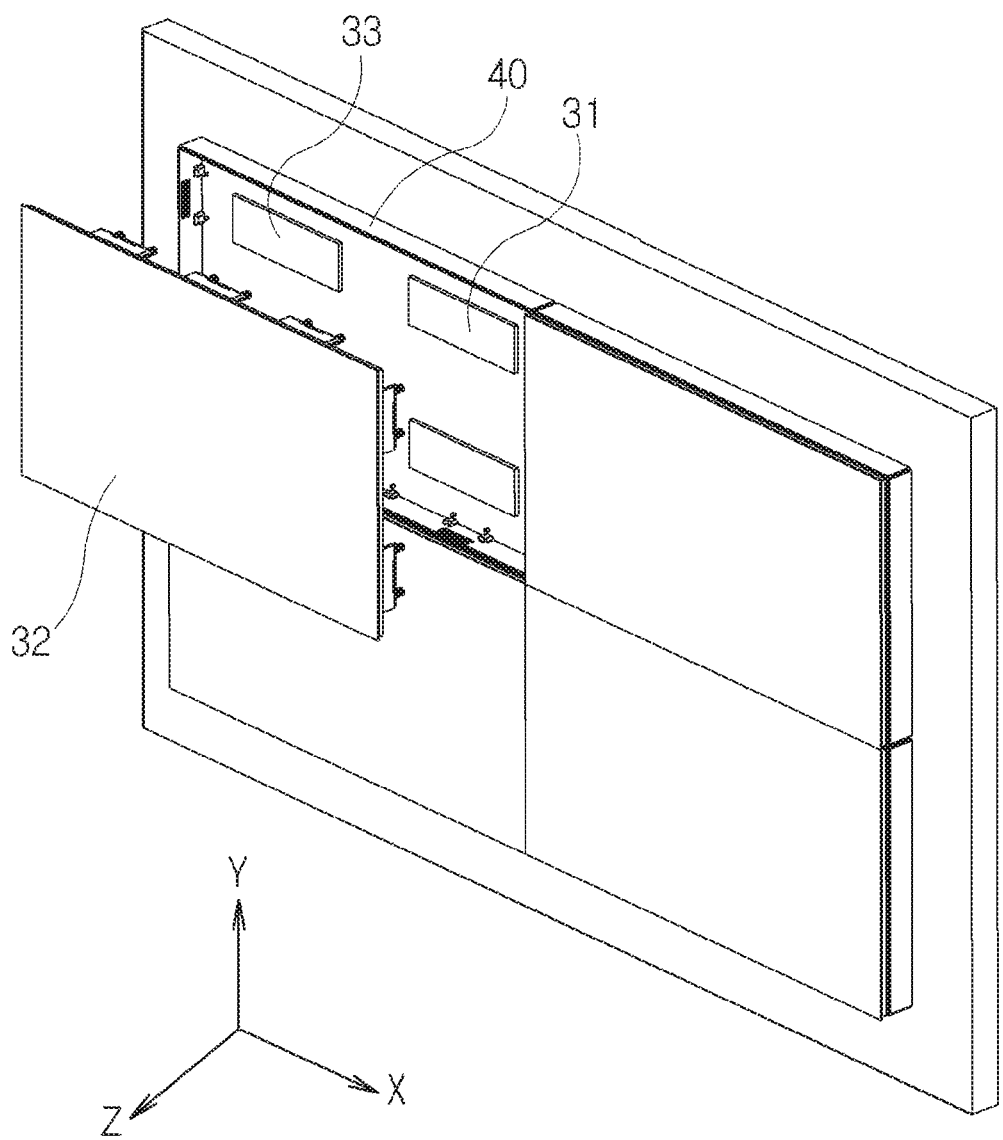
FIG. 9 is a perspective diagram schematically illustrating a state where the display panel has been installed at the back cover installed at the base frame in some of the display modules of the multi-display according to one or more embodiments of the present disclosure.
Figure 10A:
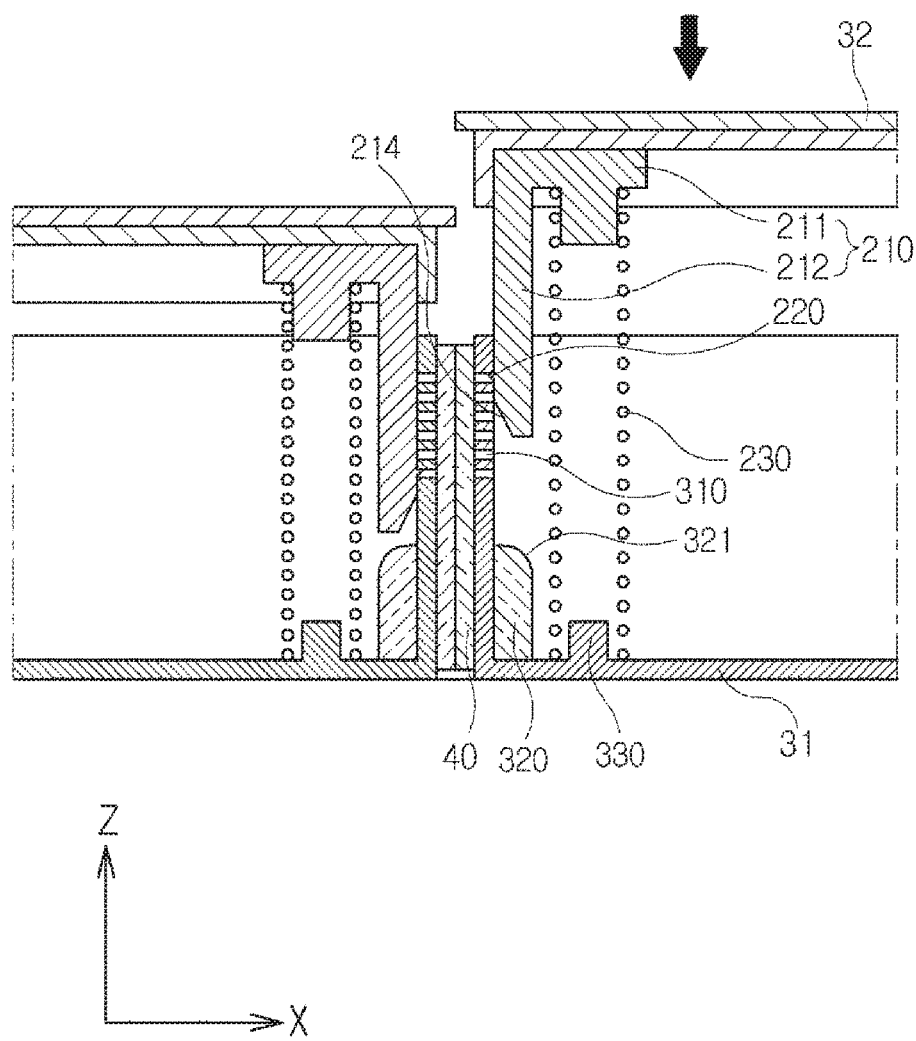
FIGS. 10A and 10B are a cross-sectional diagrams schematically illustrating a sequence or operation in which the display module is fastened and aligned with an adjacent display module in the z-axis direction in the multi-display according to one or more embodiments of the present disclosure.
Figure 10B:
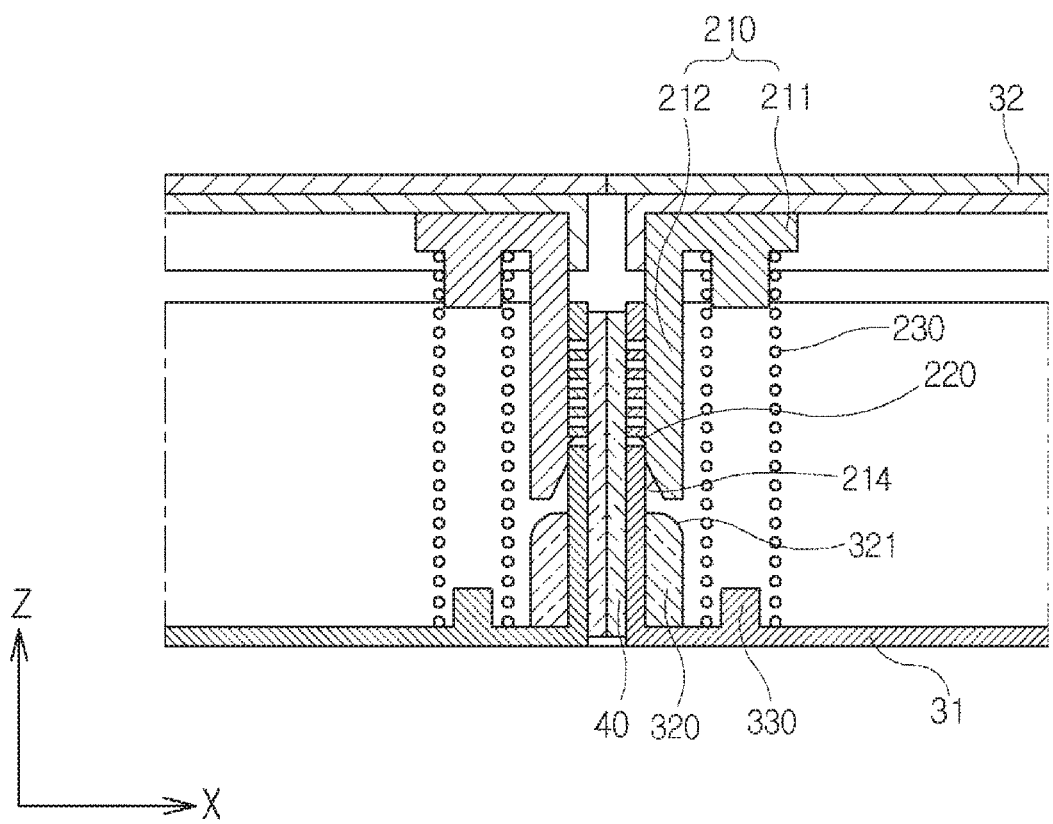

FIG. 6 is a perspective diagram schematically illustrating an installed multi-display according to one or more embodiments of the present disclosure, FIG. 7 is an exploded perspective diagram schematically illustrating a display module of the multi-display in which the display module fastening assembly and an alignment member have been provided according to one or more embodiments of the present disclosure, FIG. 8 is a perspective diagram schematically illustrating a state where the back cover of the display modules of the multi-display has been installed at a base frame according to one or more embodiments of the present disclosure, FIG. 9 is a perspective diagram schematically illustrating a state where the display panel has been installed at the back cover installed at the base frame in some of the display modules of the multi-display according to one or more embodiments of the present disclosure, and FIGS. 10A and 10B are cross-sectional diagrams schematically illustrating a sequence or operation in which the display module is fastened and aligned with an adjacent display module in the z-axis direction in the multi-display according to one or more embodiments of the present disclosure.

Referring to FIGS. 6 to 10, a multi-display device 10 (which may be referred to herein as a multi-display 10) according to one or more embodiments of the present disclosure is provided in which a plurality of display modules 30 are fastened to a base frame 20.

Each of the display modules 30 includes the back cover 31 fastened to a base frame 20 by a coupling member 33 (which may be referred to herein as a coupling part 33), the display panel 32 coupled to the back cover 31, and the display module fastening assembly 100 provided on the display panel 32 and for detachably fastening the display panel 32 to the back cover 31, e.g., by pressing the display panel 32 into the back cover 31.

As previously described herein, the display module fastening assembly 100 includes a plurality of support grooves 310 on the sidewalls 37 of the back cover 31 and formed to be spaced at a certain interval apart from each other in the insertion direction (e.g., the Z-axis direction) of the display panel 32, and the fastening part 200 provided on the display panel 32 and supported by any one of the plurality of support grooves 310 to insert and fasten the display panel 32 to the back cover 31 step by step (e.g., incrementally as the display panel 32 is inserted into the back cover 31), and for separating the display panel 32 from the back cover 31 by the elastic restoring force when the display panel 32 is further pressed to be detached from the plurality of support grooves 310.

Herein, since the back cover 31, the display panel 32, and the display module fastening assembly 100 have been described above in detail with reference to FIGS. 1 to 5, a detailed description thereof will be omitted below.

The coupling part 33 is provided for removably coupling or fastening the back cover 31 to the base frame 20.

In some embodiments, the coupling part 33 can be formed of a magnet or a magnetic material and disposed inside the back cover 31 (e.g., along the inner rear surface 35), and the base frame 20 may be made of a metal material and can be prepared so that the back cover 31 is fastened and fixed to the base frame 20 by a magnetic force. That is, the back cover 31 is fixed by the magnetic force, such that when it is desirable to adjust the position of the back cover 31 for the alignment, it is possible to easily adjust the position by slightly tapping the side surface of the back cover 31 by using a rubber hammer, etc.

It will be readily appreciated that the coupling part 33 may be prepared or formed as a magnet as an example; however, embodiments provided herein are not limited thereto, and in various embodiments, any conventional fastening methods such as screw fastening by a bolt can also be applied as the coupling part 33. Moreover, in some embodiments, the coupling part 33 may be provided on an outer rear surface of the back cover 31 so that the coupling part 33 is provided between the back cover 31 and the base frame 20. In some embodiments, the coupling part 33 may be adhesive attached to one or both of the base frame 20 and the back cover 31, thereby coupling the back cover 31 to the base frame 20.

Furthermore, the multi-display 10 according to one or more embodiments of the present disclosure further includes an alignment member 40 attached along the outside of one or more of the sidewalls 37 of the back cover 31, and prepared to form the interval with the side surface of an adjacent back cover 31 of the multi-display 10 so that the display panel 32 does not have a gap with the adjacent display panel. That is, the alignment member 40 may be provided between adjacent back covers 31 of the multi-display 10, and the alignment member 40 may extend between the adjacent back covers 31, with each of the adjacent back covers 31 abutting and in contact with the alignment member 40 disposed therebetween. In this way, the alignment member 40 secures a space between the back covers 31 which can accommodate insertion of respective display panels 32 into the back covers 31, which in some cases may have dimensions (e.g., an outer perimeter dimension) that is somewhat larger than dimensions of the back covers 31.

If the widths of the display panel 32 in the X-axis and Y-axis directions are larger than the back cover 31, the end portion of the display panel 32 is protruded to the outside of the back cover 31 when the display panel 32 is fastened to the back cover 31. In this case, when the back cover 31 is fastened to the base frame 20, it should be fastened considering the size of the display panel 32. However, it is difficult for the user to attach the back cover 31 to the base frame 20 to accurately set the interval between the back covers, and when the interval between the back covers is narrower than the target interval, there is a risk of the breakage by colliding with the adjacent display panel at the installing the display panel.

Therefore, in some embodiments of the present disclosure, it is possible to easily adjust the interval between the back covers by attaching the alignment member 40 along the outer surface of the sidewalls 37 of the back cover 31. That is, when the alignment member 40 is attached along the outer perimeter of the back cover 31 (e.g., along the outer surface of the sidewalls 37), by forming the thickness of the alignment member 40 to have a size corresponding to an amount or distance at which the adjacent display panels 32 protrude beyond the outside or outer edges of the back cover 31, it can be installed by closely contacting the back cover 31 attached with the align member 40 in the X-axis and the Y-axis directions without separately adjusting the interval.

In some embodiments, the alignment member 40 may be formed of a magnet or magnetic material in order to be easily detached from the back cover 31. Embodiments are not limited thereto, and in various embodiments, the alignment member 40 may be attached to the sides of the back cover 31 by any suitable technique, including, for example, by an adhesive material, fasteners such as screws, bolts, or the like, or any other suitable technique. The thickness of the alignment member 40 may be selected as desired in order to provide the desired spacing between adjacent back covers 31, for example, to accommodate an amount of protrusion by the display panels 32 beyond the outer edges of the back covers 31. In some embodiments, two alignment members 40 may be provided between adjacent back covers 31, for example, with one alignment member 40 on each of the back covers 31. In such embodiments, the thickness of each of the alignment members 40 may be selected to correspond to an amount of overshoot or a distance at which the respective display panels 32 extend beyond the outer edge of the respective back covers 31.

An order in which the multi-display 10 may be assembled or fastened (e.g., as shown in FIG. 8) according to one or more embodiments of the present disclosure will now be described. The alignment member 40 is attached along the outer perimeter (e.g., along the outer surface of the sidewalls 37) of the back cover 31, which is then attached to the base frame 20 in a tile form using the coupling part 33. At this time, the back cover 31 can be disposed in close contact with the adjacent back cover 31 by the attached align member 40, thereby easily aligning in the X-axis and the Y-axis directions.

Then, when the back cover 31 is completed to be disposed on the base frame 20, as illustrated in FIG. 9, the display panels 32 are respectively inserted into and fastened to the back covers 31. At this time, it is possible to easily align the display panel 32 in the Z-axis direction through the display module fastening assembly 100. For example, as illustrated in FIG. 10A, one display panel 32 can be inserted into the back cover 31 to install at the desired height (e.g., as shown in left side of FIG. 10A) and then another display panel 32 can be inserted into the back cover 31, and can be fastened to have the same height as that of the adjacent display panel by pressing the display panel 32 inwardly toward the inner rear surface of the back cover to a selected height, as illustrated in FIG. 10B.

If it is desired to reinstall or adjust the height of one or more of the display panels 32 of the multi-display 10, it can be again installed after separating the display panel 32 from the back cover 31 by the elastic force of the elastic member 230 by pressing the display panel 32, as previously described herein, and the display panel 32 may then be reinstalled in the back cover 31 at a selected or desired height by pressing the display panel 32 inwardly toward the back cover 31.

Herein, although it has been illustrated in the drawings that the four back covers 31 are arranged in two rows and two columns on the base frame 20, the present disclosure is not limited thereto and the multi-display 10 can be prepared in various forms as desired, for example, according to the installation place, such as in two rows and three columns or three rows and four columns, or any other number of rows and columns.

According to the display module fastening assembly and the multi-display including the same according to the various embodiments of the present disclosure, it is possible to perform the installation and disassembly works of the display module within the front space of the display module, thereby improving the convenience and the speed of the installation work of the worker.

In addition, according to the present disclosure, it is possible to perform the installation and disassembly works of the display module within the front space of the display module, thereby easily installing the multi-display even in the narrow space without the space for the rear work of the multi-display.

In addition, according to the present disclosure, it is possible to easily adjust the gap in the X, Y, and Z-axes directions between the display modules, thereby minimizing the gap between the display modules and enhancing the display quality of the display.

As described above, although the present disclosure has been described with reference to certain example embodiments and drawings, it should be understood that the present disclosure is not limited thereto and various modifications can be made by those skilled in the art to which the present disclosure pertains within the technical spirit of the present disclosure and the equivalent scope of the appended claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display module fastening assembly, comprising:
  a back cover having a surface and sidewalls that extend from the surface along a first direction;
  a fastener receptacle including a plurality of grooves formed in at least one of the sidewalls of the back cover and a guide rib extending from the surface of the back cover along the first direction; and
  a fastener configured to be detachably received in the groove of the fastener receptacle,
  wherein the guide rib has an inclined surface that faces an end surface of the fastener along the first direction.

2. The display module fastening assembly of claim 1 wherein the fastener includes:
  a fixing portion configured to fix the fastener to a display panel;

a contact portion extending from and transverse to the fixing portion, the contact portion configured to be selectively inserted into the back cover adjacent to the fastener receptacle along the first direction; and a support protrusion that extends outwardly from the contact portion, the support protrusion extending along a second direction that is transverse to the first direction and configured to fit into the groove of the fastener receptacle when the contact portion is inserted into the back cover along the first direction.

3. The display module fastening assembly of claim 2 wherein the inclined surface of the guide rib faces the contact portion of the fastener when the fastener is inserted into the back cover along the first direction, the contact portion of the fastener has an inclined surface configured to deflect the contact portion of the fastener inwardly away from the one of the sidewalls of the back cover upon contacting the inclined surface of the guide rib, and at least one of the inclined surface of the guide rib or the inclined surface of the contact portion of the fastener is rounded.

4. The display module fastening assembly of claim 2 wherein the fastener further includes an elastic member, the elastic member having a first end coupled to the fixing portion.

5. The display module fastening assembly of claim 4 wherein the fastener further includes a fastening protrusion extending from the fixing portion, the elastic member at least partially surrounding the fastening protrusion.

6. The display module fastening assembly of claim 4 wherein the fastener receptacle includes a guide protrusion extending from the surface of the back cover along the first direction, the elastic member having a second end configured to at least partially surround the guide protrusion when the fastener is inserted into the back cover along the first direction.

7. The display module fastening assembly of claim 4 wherein the elastic member is a spring.

8. The display module fastening assembly of claim 1 wherein the plurality of grooves are spaced apart from one another along the first direction.

9. The display module fastening assembly of claim 1 wherein the guide rib is positioned to face the end surface of the fastener when the fastener is inserted into the back cover along the first direction.

10. The display module fastening assembly of claim 9 wherein the fastener has an inclined surface configured to deflect the fastener inwardly away from the one of the sidewalls of the back cover upon contacting the inclined surface of the guide rib.

11. The display module fastening assembly of claim 10 wherein at least one of the inclined surface of the guide rib or the inclined surface of the fastener is rounded.

12. A display panel module, comprising:
a display panel;
a fastener attached to a surface of the display panel;
a back cover having a surface and sidewalls connected to the surface of the back cover, the back cover including a fastener receptacle arranged along one of the sidewalls, the fastener receptacle configured to receive the fastener,
wherein the display panel is configured to be detachably coupled to the back cover at any of a plurality of positions, each of the plurality of positions corresponding to a different depth at which the fastener extends toward the surface of the back cover and is coupled to the fastener receptacle,
wherein the display panel is configured to be selectively detached from the back cover by depressing the display panel toward the back cover beyond a last position of the plurality of positions and subsequently releasing the display panel.

13. The display panel module of claim 12 wherein the display panel is configured to be selectively advanced to successive positions of the plurality of positions by depressing the display panel toward the back cover.

14. The display panel module of claim 12 wherein the fastener includes a contact portion extending from the surface of the display panel along a first direction, and a support protrusion extending outwardly from the contact portion along a second direction that is transverse to the first direction, the fastener receptacle includes a plurality of grooves formed in at least one of the sidewalls of the back cover and spaced apart from one another along the first direction, and the support protrusion of the fastener is inserted into a corresponding one of the grooves at each of the plurality of positions.

15. The display panel module of claim 14 wherein the fastener further includes:
a fixing portion attached to the surface of the display panel, the contact portion extending along the first direction from the fixing portion; and
an elastic member having a first end coupled to the fixing portion.

16. The display panel module of claim 14 wherein the fastener receptacle further includes a guide rib extending from the surface of the back cover along the first direction, the guide rib positioned to face an end surface of the contact portion of the fastener when the fastener is inserted into the back cover along the first direction.

17. The display panel module of claim 16 wherein the guide rib has an inclined surface that faces the end surface of the contact portion of the fastener along the first direction, and the contact portion of the fastener has an inclined surface configured to deflect the contact portion inwardly away from the one of the sidewalls of the back cover upon contacting the inclined surface of the guide rib.

18. A multi-display device, comprising:
a plurality of display panel modules arranged in a tiled configuration, each of the display panel modules disposed adjacent to at least one other of the display panel modules, each of the display panel modules including:
a display panel;
a fastener attached to a surface of the display panel;
a back cover having a surface and sidewalls connected to the surface of the back cover, the back cover including a fastener receptacle arranged along one of the sidewalls, the fastener receptacle configured to receive the fastener,
wherein each of the display panels is configured to be detachably coupled to a respective back cover at any of a plurality of positions, each of the plurality of positions corresponding to a different depth at which the fastener extends toward the surface of the respective back cover and is coupled to the fastener receptacle,
wherein each of the display panels is configured to be selectively detached from the respective back cover by depressing the display panel toward the back cover beyond a last position of the plurality of positions and subsequently releasing the display panel.

19. The multi-display device of claim 18, further comprising:
a plurality of alignment members, each of the alignment members disposed between adjacent back covers of the display modules, the plurality of alignment members sized to prevent contact between neighboring display panels when the neighboring display panels are inserted into the adjacent back covers.

20. The multi-display device of claim 18 wherein the plurality of alignment members are magnetically attachable to outer surfaces of the sidewalls of the back covers.

21. The multi-display device of claim 18, further comprising:
a plurality of coupling members configured to removably secure the back covers to an external structure.

22. The multi-display device of claim 21 wherein the coupling members include magnetic material and are configured to magnetically secure the back covers to the external structure.

\* \* \* \* \*